(12) United States Patent
Kulkarni et al.

(10) Patent No.: US 10,274,381 B2
(45) Date of Patent: Apr. 30, 2019

(54) PIPELINE CONSTRICTION DETECTION

(71) Applicants: Mohan G. Kulkarni, The Woodlands, TX (US); Larry D. Talley, Friendswood, TX (US)

(72) Inventors: Mohan G. Kulkarni, The Woodlands, TX (US); Larry D. Talley, Friendswood, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 832 days.

(21) Appl. No.: 14/727,541

(22) Filed: Jun. 1, 2015

(65) Prior Publication Data

US 2015/0377716 A1 Dec. 31, 2015

Related U.S. Application Data

(60) Provisional application No. 62/019,315, filed on Jun. 30, 2014.

(51) Int. Cl.
*G01D 5/353* (2006.01)
*G01K 11/32* (2006.01)
(Continued)

(52) U.S. Cl.
CPC .............. *G01K 11/32* (2013.01); *E21B 47/06* (2013.01); *E21B 47/102* (2013.01); *G01B 21/085* (2013.01); *G01D 5/35358* (2013.01)

(58) Field of Classification Search
CPC ............ G01K 7/02; G01K 3/005; G01K 3/10; G01K 7/42; G01K 7/22; G01K 2013/024; G01K 7/16; G01K 7/01; G01K 7/10; G01K 11/32; G01K 13/00; G01K 13/02; G01K 2205/04; B23K 31/02; H02M 1/32; H02M 1/38; H02M 1/53806; H01C 7/008; H01C 17/00; H01R 4/023; H01R 4/029; H01R 43/28; G01R 31/048; G01R 31/40; G01R 31/2642; G01J 5/004; G01J 5/00; G01J 5/003; G01J 5/043; G01J 5/0821;
(Continued)

(56) References Cited

U.S. PATENT DOCUMENTS 5,453,944 A 9/1995 Baumoel
5,861,546 A 1/1999 Sagi et al.
(Continued)

OTHER PUBLICATIONS

Kulkarni, Mohan G., et al. (ExxonMobil Upstream Corp), "Offshore Pipeline Leak Detection System Concepts and Feasibility Study," Proceedings of the Twenty-second (2012) International Offshore and Polar Engineering Conference, Rhodes, Greece, Jun. 2012, pp. 383-385.

*Primary Examiner* — Manish S Shah
(74) *Attorney, Agent, or Firm* — ExxonMobil Upstream Research Company- Law Department

(57) ABSTRACT

The present techniques are directed to a pipeline transporting a production fluid including hydrocarbon. An optical fiber is disposed along a length of the pipeline. A control system determines a predicted operating temperature based on pressure and flow rate of the production fluid in the pipeline. The control system determines a measured temperature along the pipeline using the optical fiber. The control system detects and locates a temperature anomaly by comparing the measured temperature of the pipeline to the predicted operating temperature.

30 Claims, 6 Drawing Sheets

(51) Int. Cl.
*E21B 47/06* (2012.01)
*E21B 47/10* (2012.01)
*G01B 21/08* (2006.01)

(58) Field of Classification Search
CPC ..... A47J 43/287; F16M 13/02; F16M 13/022; G01F 1/00; G01N 25/72; G01N 25/28; G01N 25/32; G01N 33/225; G01N 33/02; H05K 7/20945; F24F 11/0012; F24F 2001/0052; F24F 2011/0093; F24F 11/022; F16B 2/02; F16B 1/00; F16B 47/00; F16B 2001/0035
See application file for complete search history.

(56) References Cited

U.S. PATENT DOCUMENTS

| | | | |
|---|---|---|---|
| 6,644,848 B1 * | 11/2003 | Clayton | G01B 7/06 374/131 |
| 6,813,403 B2 * | 11/2004 | Tennyson | G01D 5/35383 250/227.11 |
| 7,274,996 B2 * | 9/2007 | Lapinski | G01F 1/666 702/48 |
| 8,177,424 B2 | 5/2012 | Hampson et al. | |
| 8,520,195 B2 | 8/2013 | Ramos et al. | |
| 8,579,504 B2 | 11/2013 | Koeniger et al. | |
| 8,594,938 B2 | 11/2013 | Guglielmo et al. | |
| 9,593,568 B1 * | 3/2017 | LeMonds | E21B 47/0001 |
| 2004/0059505 A1 | 3/2004 | Gallagher | |
| 2005/0283276 A1 | 12/2005 | Prescott et al. | |
| 2011/0088910 A1 | 4/2011 | McCann et al. | |
| 2011/0149688 A1 | 6/2011 | Hill et al. | |
| 2011/0229071 A1 | 9/2011 | Vincelette et al. | |
| 2013/0033272 A1 | 2/2013 | Folgeroe et al. | |
| 2013/0090867 A1 | 4/2013 | Strong | |
| 2013/0145826 A1 * | 6/2013 | Richarz | G01M 3/00 73/49.1 |
| 2013/0033474 A1 | 12/2013 | Godfrey et al. | |

\* cited by examiner

100A

100B

400

PIPELINE CONSTRICTION DETECTION

CROSS-REFERENCE TO RELATED APPLICATION

This application claims the benefit of U.S. Provisional Application No. 62/019,315, filed Jun. 30, 2014, entitled PIPELINE CONSTRICTION DETECTION, the entirety of which is incorporated by reference herein.

FIELD

The present techniques relate generally to the recovery and delivery of production fluids. More specifically, the techniques relate to employing hydraulic determinations and fiber-optic distributed sensing of temperature to detect and locate a constriction in a pipeline conveying production fluids.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Constrictions may develop within a pipeline during the operational life of the pipeline and can present significant challenges to pipeline flow management. A constriction in the pipeline may result from deposition of solids on the internal surface of the pipeline, mechanical damage to the external or internal surfaces of the pipeline, the presence of an object lodged inside the pipeline, and so forth. Examples of solids deposited or accumulated on the internal surface of the pipeline may include hydrates, wax, asphaltenes, and the like. An example of mechanical damage causing a constriction is an external impact denting the external surface of the pipeline, giving a pipe-wall bulge into the flow path of the pipeline. Another example of mechanical damage resulting in a constriction is an internal impact causing an inner pipe surface irregularity, extending and protruding from the pipe-wall into the flow path.

The detection of the location of constrictions within long pipelines can be problematic. Constrictions may be diagnosed by running an intelligent pig through a pipeline. The pig generally has sensors to measure pipe diameter, pipewall thickness, and other dimensional features. Indeed, intelligent pigs may be useful to detect corrosion-induced pitting, loss of material inside a pipe, and similar abnormalities. In all, an operator in an effort to detect a possible constriction or developing constriction has generally relied on conventionally-collected data at hand or has arranged to collect non-routine data. Moreover, the assessment of such data has typically been by trial and error and based on human operating experience and comparison to historical data.

SUMMARY

An aspect of the present disclosure relates to a pipeline system having a pipeline to transport a production fluid including hydrocarbon. The pipeline system includes an optical fiber disposed along a length of the pipeline. A control system has a hydraulic flow model to determine a predicted operating temperature at each of a plurality points along the pipeline, wherein inputs to the hydraulic flow model include pipeline hydraulic conditions comprising pressure and flow rate of the production fluid in the pipeline. The control system includes a temperature module to determine a measured temperature at each of the plurality of points along the pipeline using the optical fiber. The control system has an analysis module to compare the measured temperature of the pipeline at each of the plurality of points to the predicted operating temperature to detect a temperature anomaly and determine a location of the temperature anomaly.

Another aspect of the present disclosure relates to a method of operating a pipeline system, the method including conveying a production fluid having hydrocarbon through a pipeline and sensing temperature of the pipeline via an optical fiber as a distributed sensor disposed along the pipeline. The method includes determining pressure and flow rate of the production fluid in the pipeline via instrumentation in the pipeline system and determining normal temperature of the pipeline via a hydraulic flow model having the pressure and the flow rate as inputs. The method includes detecting via a control system a constriction in the pipeline based on the temperature of the pipeline sensed by the optical fiber and based on a comparison of the temperature of the pipeline sensed by the optical fiber versus the normal temperature determined by the hydraulic flow model.

Yet another aspect of the disclosure relates to a method of constructing or retrofitting a pipeline system, the method including deploying a fiber-optic cable along a pipeline configured to convey production fluid having hydrocarbon, and the fiber-optic cable having an optical fiber as a distributed sensor to facilitate measurement of temperature of the pipeline. The method includes coupling optical control components to the fiber-optic cable, the optical control components including a light source and a detector. Further, the method includes providing a control system of the pipeline system to employ a hydraulic flow model to calculate a predicted temperature of the pipeline, wherein inputs to the hydraulic flow model comprise pressure and flow rate of the production fluid. The control system detects a temperature anomaly and identifies a location along the pipeline of the temperature anomaly based on the temperature measured via the optical fiber, and detects a constriction in the pipeline at the location based on the temperature anomaly and on a comparison of the temperature measured via the optical fiber versus the predicted temperature of the pipeline calculated by the hydraulic flow model.

DESCRIPTION OF THE DRAWINGS

The advantages of the present techniques are better understood by referring to the following detailed description and the attached drawings, in which.

DETAILED DESCRIPTION

Figure 1:
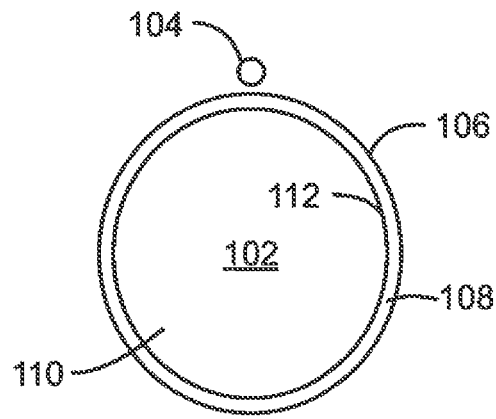
FIG. 1 is a cross-section of an exemplary pipeline system having a fiber-optic cable disposed along the external surface of the pipeline to sense pipeline temperature.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

As used herein, "substantially", "predominately" and other words of degree are relative modifiers intended to indicate permissible variation from the characteristic so modified. It is not intended to be limited to the absolute value or characteristic which it modifies, but rather possessing more of the physical or functional characteristic than its opposite, and preferably, approaching or approximating such a physical or functional characteristic.

Embodiments of the present techniques are directed to pipeline systems and associated control systems that detect and locate a constriction in the pipeline based on pipeline temperatures sensed by a distributed fiber-optic sensor. In other words, the pipeline system employs a distributed fiber-optic sensor to measure pipeline temperature, and the control system relies on the sensed temperature to detect and locate a constriction in the pipeline. For example, the control system may interpret a sensed reduction in pipeline temperature as a Joule-Thomson effect on the contents (e.g., production fluid) and as pointing to a constriction in the pipeline. Further, to clarify a possible constriction, the control system may compare the data from the temperature sensor (e.g., optical fiber) to the real-time predicted fluid temperature, for example, as calculated by a pipeline hydraulic flow model simulation software package. Such hydraulic flow model relies on pipeline pressure and flow rate values as input to give a simulated or calculated value of pipeline temperature. Moreover, temperature values indicated by conventional temperature measurement devices may be utilized in certain examples.

A temperature deviation may be detected via the optical fiber. The temperature deviation may be a contradiction between sensed temperature versus calculated temperature. When a temperature deviation is detected, the control system and its software may generate a warning signal or an alarm to alert personnel. The control system may automatically activate a remediation action, and so on.

In sum, the control system may detect the presence of the constriction, determine the location of the constriction along the length of the pipeline, alert personnel of the constriction, and implement remedial action of the constriction. The control system may automatically implement the remedial action. On the other hand, the control system may implement the remedial action upon human acknowledgment, such as with operating personnel accepting implementation of remedial action prompted by the control system.

As discussed above, several types of constrictions may develop within pipelines during their operational life. Examples or types of constrictions include deposition of solids, such as hydrates, wax, and asphaltenes; the presence of dents or gouges in the pipeline; and so on. Embodiments of the present techniques to detect and locate constrictions can improve pipeline flow management. Conventionally, pipeline data used to diagnose a possible constriction include pipeline inlet/outlet pressures and temperatures. These data may be routinely monitored and kept, for example, in a pipeline history data file. The use of these data for diagnosis of a constriction may employ an algorithm to compare current flow rates, temperatures, and pressures to historical values. An excessive pressure drop, temperature drop, or flow rate decrease, when compared to historical data, may indicate a possible constriction. The operator may respond to the diagnosis by applying an operating change to the pipeline to test a hypothesis of a constriction.

If the operator suspects a hydrate problem, for instance, he may initiate injection of a thermodynamic inhibitor, reduce pipeline flow rate, turn on heat tracing along the pipeline, and perform other actions. After a period of time, possibly after one day, a return to normal pressure drop, temperature, or flow rate may convince the operator that the constriction was due to hydrates and has dissipated. Unfortunately, a constriction including hydrates and other constriction types may not dissipate and instead may become debilitating, resulting in shutdown of the pipeline or flow line. Moreover, conventionally, an "excess" value of a parameter may not be recognized in time prior to a forced shutdown, especially without historical experience to understand what is excessive and the appropriate response.

Intelligent pigging can give a current picture of the pipe dimensions. This diagnostic is typically location specific and relatively positive proof, for instance, in the case of dents. However, intelligent pigging may be undesirable when the constriction is due to hydrates, wax, or asphaltenes, due to the risk of the pig sticking in the constriction. Further, intelligent pigging is generally rarely performed. Indeed, it may be uncommon for an operator to run an intelligent pig immediately or soon after an event and before remediation, when unexpected hydrate formation has occurred. Conversely, embodiments of the present techniques may employ fiber-optic distributed temperature sensing combined with hydraulic flow model analysis to relatively quickly recognize formation of a constriction, for example, hydrate formation and other solids deposition.

Furthermore, pipelines may traditionally have temperature instrumentation at multiple locations. However, the present techniques provide pipelines that additionally have distributed temperature sensors along the length of the pipeline. For example, a fiber-optic sensor may be attached externally along the length of a pipeline. Moreover, embodiments may apply to fiber-optic sensors on both flexible and rigid pipe of various diameters. In certain examples, the fiber-optic may generally not be focused on controlling or monitoring electrical traced heating cables if such is present. Instead, the fiber-optic is for monitoring temperatures of the pipe or pipeline, for example, at substantially every linear meter or so along the pipe or pipeline. Thus, the fiber-optic sensor can sense a change in fluid temperature, including temperature changes caused by hydrate formation or other pipe deposition scenarios. In certain embodiments, the optical fiber is not embedded in the pipe carcass or pipewall. In other embodiments, the optical fiber is so embedded. The optical fiber may be included within a fiber-optic cable.

Embodiments herein may apply generally to fiber-optic distributed temperature sensing on buried, unburied, subsea, onshore, and any other pipeline where deposition might be a problem. In accordance with the present techniques, fiber-optic cables including distributed fiber-optic sensors measure the temperature profile along the length of a pipeline. Such distributed fiber-optic sensing may indicate a change in temperature along the length of a pipeline as a function of time. Embodiments may use temperature change data from a fiber-optic sensor within flow management software to relatively quickly and reliably predict formation of flow constrictions in certain examples. Specific signatures from present distributed temperature sensors may provide indication of the type of constriction, such as a dent or gouge from third party damage, or hydrate or wax formation, and so on. This information may be useful in developing mitigation strategies. The techniques may provide for immediate or relatively quick detection of pipe fluid temperature changes, whether related to external temperature changes or to internal fluid changes, such as Joule-Thomson cooling after constriction formation or exothermic warming during hydrate formation.

The initial evidence of hydrate formation in a pipeline may be the onset of exothermic warming at the location(s) of fast hydrate growth. The exothermic heat may raise the temperature of the pipewall and be sufficient to raise the temperature of the fluids flowing in the pipe. The exothermic heat may be localized or dissipate along the pipewall over several pipe-diameter lengths. Installation of the fiber-optic sensor as spiraling around the pipe may increase the likelihood that the optical fiber sensor detects the exotherm. In any case, after some elapsed time, the hydrate growth may begin to affect the flow of fluids.

Indeed, as the hydrate deposit reduces the effective inside diameter of the pipe, fluids containing some fraction of gas may experience Joule-Thompson (J-T) cooling. The fluid temperature downstream of the constriction may experience an anomalous decrease in fluid temperature that is detectable by any standard conventional temperature sensor located downstream of the constriction. In most pipelines, a temperature sensor is located at or near the outlet of the pipeline, e.g., the inlet of an onshore or on-platform vessel. Thus, in such conventional systems, the detection of hydrate-induced temperature decrease occurs hours or days after the hydrate problem begins. By contrast, it is desirable to detect the exotherm caused by hydrate nucleation and growth at the location of fastest growth, and also via the subsequent cooling associated with Joule-Thomson effect of a constriction. This capability may facilitate early detection of a hydrate problem, empowering the operator to mitigate or remediate the hydrates significantly earlier than those operations where only outlet temperatures are measured. Such early detection may avoid shut-downs or reduced production rates in certain examples. Operational risk of lost production may be reduced by early detection and faster remediation. Additionally, because less hydrate will generally have formed before remediation begins, less chemical injection may be required to remediate the hydrates. Also, early detection may prevent or avoid a complete stoppage of pipeline flow and, thus, facilitate flowing of the chemical to the location(s) of the pipeline where hydrates have formed or have the potential to form.

As discussed, embodiments of the present techniques may detect the location of the temperature anomaly to within one meter, for example. This determination of location may then be compared to a steady-state fluid hydraulic flow model output, for instance. If there is a deviation in the measured fluid temperature (sensed via the optical fiber) versus the expected fluid temperature (calculated or determined via the hydraulic flow model), the pipeline control system may output a deviation warning. The operator can set the controls to automatically respond to deviations attributed to hydrates or wax by changing the operating parameters to mitigate the deposition. In the case of hydrate formation, the pipeline controls can start injection of methanol, glycols, or other mitigating chemical; turn on heat trace power; drop pressure; drop flow rates; or any other response, including combinations of these responses. Alternatively, the operator can set the controls to readout only, requiring human intervention to activate a mitigating strategy. In either an automatic mode or human-activated mode, the hydrate deposit may be detected and associated warning received hours before hydrates manifest an overall fluid temperature effect measurable at the outlet of the pipeline. Also, the determination of a more precise location of the problem may help the operator decide on the urgency of a response and beneficial types of responses. An advantage of embodiments of the present techniques is potentially less disruption of hydrocarbon production because of the relative swiftness of the response. Early mitigation may often result in no loss of production, as opposed to conventional scenarios of pipeline shut-in, because the hydrates blocked flow before remediation chemicals were able to reach the location of hydrate formation and remediate the hydrates.

In sum, to implement present embodiments, a distributed temperature sensing device including a fiber-optic cable or optical fiber may be installed along a segment of the pipe or pipeline, or along substantially the entire length of the pipe or pipeline. The cable or optical fiber may be installed external or internal to the pipe or pipeline, in a carcass of the pipeline, embedded in a wall of the pipe or pipeline, and so forth. In operation, the data from the temperature sensor (e.g., optical fiber) may be compared to the substantially real-time predicted fluid temperature calculated by a pipeline hydraulic flow model simulation software package, such as an oil and gas simulation software, for example OLGA®, Horizon, LedaFlow®, and others. When a temperature deviation is detected via the optical fiber, the control system may be programmed to generate a warning signal or an alarm that is used to alert personnel and/or activate a remediation action.

FIG. 1 is cross-section of a pipeline system 100A having a pipeline 102 and a fiber-optic cable 104 disposed along the external surface 106 of the pipeline 102. The fiber-optic cable 104 is or includes a fiber-optic sensor. The pipeline 102 has a pipewall 108 defining a flow path 110. The pipeline 102 and its pipewall 108 have an external surface 106 and an internal surface 112. The fiber-optic cable 104 may be disposed along a segment of the pipeline 102 or along substantially the entire length of the pipeline 102.

Moreover, the fiber-optic cable 104 may be disposed generally at any orientation with respect to the circumference of the pipeline. In the illustrated embodiment of FIG. 1, the fiber-optic cable 104 is depicted at the "top" of the pipeline 102. However, the cable 104 having the fiber-optic sensor may be disposed at a side portion of the pipeline 102 or at a bottom portion of the pipeline 102. Moreover, the cable 104 may be spiral wound around and along the length of the pipeline 102, or disposed in another orientation or configuration along the pipeline 102.

The fiber-optic cable 104 may be attached or otherwise coupled to the pipeline 102, and may be at least partially protected (not shown). The fiber-optic cable 104 may be a single fiber-optic cable, or a plurality or bundle of fiber-optic cables. A cable may include one or more optical fibers. The optical fibers may include a transparent core surrounded by a transparent cladding material with a lower index of refraction. Light is generally kept in the core by total internal reflection. Thus, the fiber may act as a waveguide. As discussed below, the fiber-optic cable 104 may be configured as a distributed temperature sensor to facilitate temperature measurement of the external surface 106 and pipewall 108. Such temperature measurements may indicate temperature of the flowing contents in the pipeline 102. The cable 104 may provide for distributed fiber-optic sensing and thus may be called an intrinsic sensor in certain examples.

Figure 2:
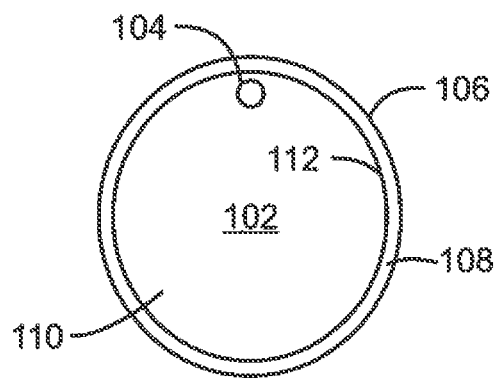
FIG. 2 is a cross-section of an exemplary pipeline system having a fiber-optic cable disposed in the pipeline flow path to sense pipeline temperature.

FIG. 2 is a cross-section of a pipeline system 100B having the pipeline 102 but with the fiber-optic cable 104 disposed in the flow path 110 of the pipeline 102. Like numbered items are as described with respect to FIG. 1. The fiber-optic cable 104 may be disposed generally at any location in or portion of the flow path 110. In the illustrated embodiment of FIG. 2, the cable 104 runs at an edge of the flow path 110 along the internal surface 112 of the pipeline 102. As mentioned, the fiber-optic cable 104 may be a single fiber-optic cable, or a plurality or bundle of fiber-optic cables. Again, each cable may include one or more optical fibers. The fiber-optic cable 104 may be configured as a distributed temperature sensor to facilitate measurement of temperature of the flowing contents in the pipeline 102. Such distributed sensing may be called an intrinsic sensor in certain instances.

Figure 3:
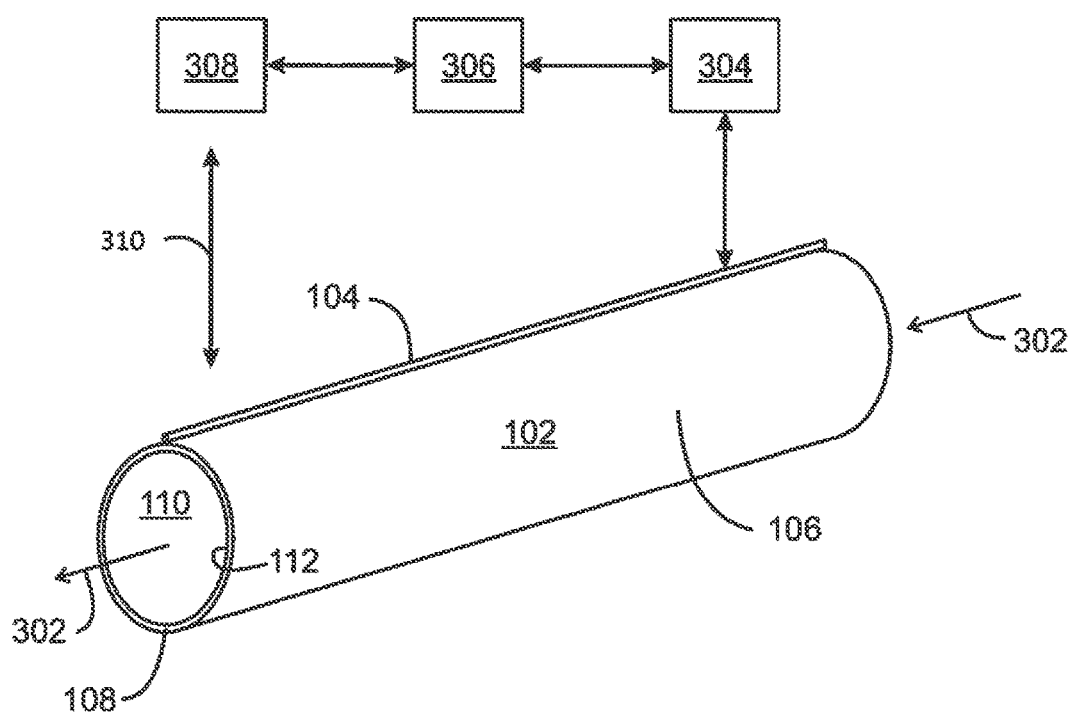
FIG. 3 is a diagrammatical representation of an exemplary pipeline system having controls, and a fiber-optic cable disposed along an external surface of the pipeline to sense pipeline temperature.

FIG. 3 is a diagrammatical representation of a pipeline system 300 having the fiber-optic cable 104 disposed along the external surface 106 of the pipeline 102, as discussed above with respect to FIG. 1. Like numbered items are as described with respect to FIG. 1. In operation, the pipeline 102 may convey flowing contents such as in the transport of production fluid, oil, gas, hydrocarbon, and the like. The direction of flow is indicated by arrows 302. Of course, in certain examples, the pipeline system 300 may be reconfigured to flow pipeline contents in the opposite direction. Further, other fluids and solids may be conveyed.

The pipeline system 300 includes a fiber-optic cable 104 disposed along the external surface 106 of the pipeline 102 to sense temperature of the pipeline 102. In this example, the fiber-optic cable 104 is a sensor that provides for distributed sensing and thus may be called an intrinsic sensor. In the illustrated embodiment, the temperature sensed may be the pipewall 108 temperature. The pipewall 108 temperature may be indicative of or correlative to the temperature of the contents flowing through the pipeline 102. In other examples, such as with the fiber-optic cable 104 disposed in the flow path 110 of the pipeline 102 (see FIG. 2), the temperature of the flowing contents may be more directly measured via the fiber-optic cable 104.

In operation, pulses of laser light are sent into the fiber-optic cable 104 laid along the length of the pipeline 102. The light is partially backscattered by the cable 104 material throughout the cable 104 length generating scattered components. This backscattering process is influenced by the cable 104 physical properties, which are in turn dependent on adjacent temperature. For example, changes in the temperature of the fiber-optic cable 104 may affect the refractive index of a core of an optical fiber in the fiber-optic cable 104, the cladding of an optical fiber, or both, affecting the total internal reflectance of the light waves within the optical fiber. This may change the amount of backscattered light, the wavelengths of the backscattered light, or both. Therefore, by analyzing the characteristics of the backscattered light, information about adjacent temperature along the cable 104 may be obtained. In certain embodiments, the cable 104 temperature sensitivity may be relatively high, which may facilitate location of constriction events along the length of a pipeline within a few meters.

The performance characteristics (e.g., sensitivity, accuracy, spatial resolution, distance range, etc.) of temperature-based distributed fiber-optic sensors may be a function of several parameters including the fiber length, optical attenuation, data acquisition time, and pulse width of the laser introducing light into the optical fiber. The temperature gradient measurement sensitivity of a sensor may range between 0.5° C.-3° C., depending on location along the length of the sensor cable and other factors.

The fiber-optic cable 104 sensor is employed in conjunction with optics control components 304 to measure temperature. The optics control components 304 may include a light source, detector, signal processor, and the like. The optics control components 304 may indicate the sensed temperature to a control system 306. The optics control components may be an apparatus coupled to an end of the fiber-optic cable 104. On the other hand, the optics control components 304 may include dispersed components, such as a light source disposed at one end of the fiber-optic cable 104 and a detector disposed at another end of the fiber-optic cable 104. Further, in alternate embodiments, the control system 306 may accommodate signal processing associated with the fiber-optic cable 104, light source, and detector.

The control system 306 may be a distributed control system (DCS), programmable logic controller (PLC), and so on. The control system 306 may include a human interface (HMI) and facilitate control of the pipeline system 300. Moreover, instrumentation 308 may provide for measurement and indication of pressure and flow rate of the pipeline 102 contents, as well as additional process data. The instrumentation 308 may be part of or coupled to the control system 306.

The instrumentation 308 is part of or coupled to the pipeline 102 and associated equipment in the pipeline system, as indicated by arrow 310. For example, the instrumentation may include a pressure measurement device (e.g., a pressure sensor, gauge, transmitter, etc.) disposed along the pipeline 102 including at a pump discharge or pumping station, for instance, to measure pressure of the production fluid in the pipeline 102. In another example, the instrumentation may include a flow measurement device, such as a mass meter, flow measurement orifice, and so on, to measure and indicate flow rate of the production fluid flowing through the pipeline 102. A variety of instrument devices are contemplated as included in the instrumentation 308.

The control system 306 receives temperature inputs from the optics control components 304, and receives pressure and flow-rate inputs from the instrumentation 308. The control system 306 is programmed to detect a constriction in the pipeline 102 based on the measured temperature, measured pressure, and measured flow-rate, and optionally other factors. The control system 306 may also be configured and programmed to alert personnel of a constriction, suggest or implement actions in response to determination of a constriction to mitigate the constriction, and so forth.

In sum, embodiments may accommodate a pipeline system 300 having a pipeline 102 that transports a hydrocarbon production fluid. A fiber-optic cable 104 having an optical fiber is disposed along a length of the pipeline 102 to sense temperature of the pipeline 102, wherein the optical fiber is a distributed sensor. The optical fiber may generally be an intrinsic sensor with the fiber itself as the sensor to provide the distributed sensing. The temperature of the pipeline 102 sensed by the optical fiber may be the temperature of the pipewall 108 of the pipeline 102, or the temperature of the production fluid, and the like. The optical fiber may be disposed along an external surface 106 of the pipeline 102, or in a flow path 110 of the pipeline 102, and so forth. Further, the pipeline system 300 includes instrumentation 308 to measure the pressure of the production fluid in the pipeline 102, and instrumentation 308 to determine the flow rate of the production fluid in the pipeline 102, and the like. A pressure/strain sensing fiber-optic placed internally in the pipeline 102 could be additionally utilized.

A control system 306 determines the presence of a constriction in the pipeline 102 correlative with the temperature and hydraulic conditions of the pipeline 102. The hydraulic conditions include pressure and flow rate of the production fluid in the pipeline 102. The hydraulic conditions involve a calculated temperature of the pipeline 102 correlative with the pressure and flow rate. The control system 306 compares this calculated temperature versus the temperature sensed by the optical fiber to determine the presence of the constriction. Moreover, the hydraulic conditions may include temperature of the pipeline 102 indicated by a temperature sensor other than the optical fiber.

In general, the control system 306 compares the temperature of the pipeline 102 sensed by the optical fiber with the hydraulic conditions to determine the presence of the constriction in the pipeline. The control system 306 has a temperature model to determine the measured temperature via the optical fiber and a hydraulic flow model utilizing the pressure and the flow rate as inputs. Furthermore, the control system 306 may determine a location of the constriction substantially contemporaneous with determination of the presence of the constriction. Moreover, the control system 306 may integrate various components, such as the temperature module, the hydraulic flow model, and the analysis module, with flow management software. Also, the control system 306 may alert personnel of the constriction detected by the control system 306, and/or automatically implement remedial action directed to the constriction detected by the control system 306, and so on.

Figure 4:
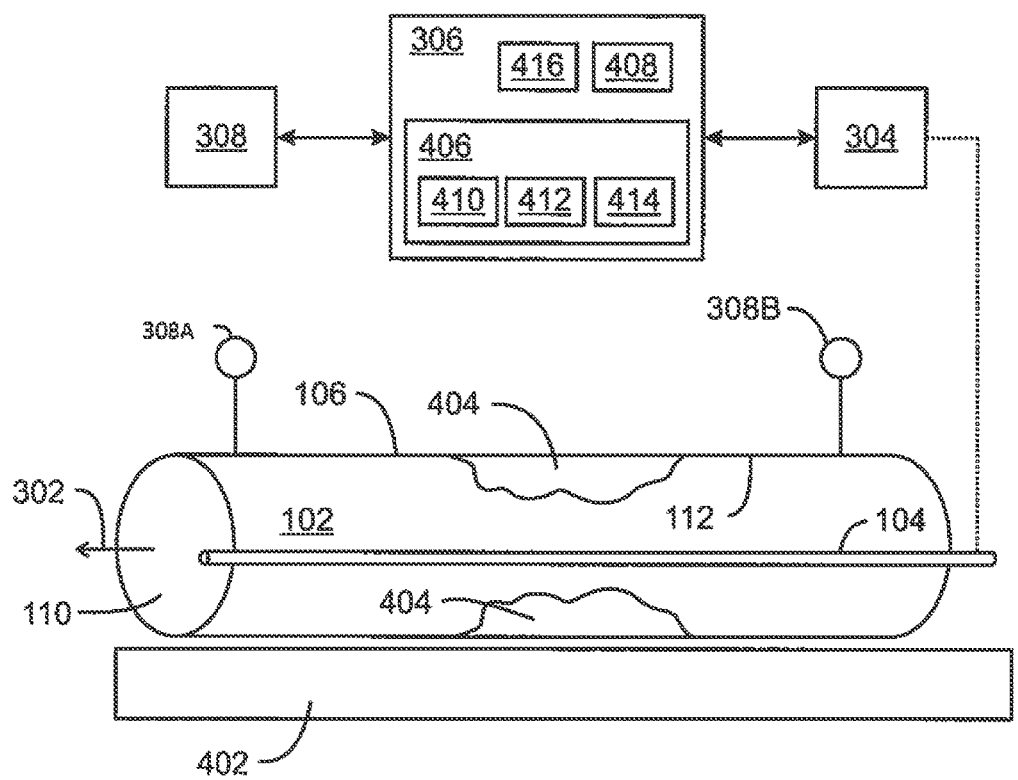
FIG. 4 is diagrammatical representation of an exemplary pipeline system having controls, and a fiber-optic cable to sense pipeline temperature and disposed along an external surface of a pipeline having a constriction.

FIG. 4 is a diagrammatical representation of a pipeline system 400 having pipeline 102 resting on or coupled to a support 402. Like numbered items are as described with respect to FIGS. 1 and 3. The pipeline 102 may be deployed subsea or onshore, above-ground or underground, and so forth. In some examples, the support 402 may be the bottom of a trench, the seafloor, a pipe stand, and the like, or any combinations thereof. In examples, the pipeline system 400 conveys and transports a production fluid, such as hydrocarbons, etc., through the pipeline 102.

As an example, the pipeline 102 in the illustrated embodiment undesirably has a constriction 404 that developed during operation. In this illustration, the constriction 404 includes solids that have accumulated on the inner surface 112 of the pipeline 102, such as from hydrates formation, wax accrual, asphaltenes precipitation and deposition, and the like. In other examples, the constriction 404 may be an intrusion of the pipewall 108 into the flow path 110 that may result from mechanical damage such as an external dent, for instance.

As discussed, the fiber-optic cable 104 is used to sense temperature. In operation in the illustrated context, a temperature increase may be initially sensed via the fiber-optic cable 104 near the constriction 404 as the solids accumulate, such as from the exothermic formation of hydrates. However, a temperature decrease may be subsequently sensed via the fiber-optic cable 104 at or near the constriction 404 due to the reduction of the effective diameter of the pipeline 102 at the constriction 404. For example, a temperature reduction may be caused by a Joule-Thomson effect that lowers the temperature of the pipeline 102 contents at the discharge of the constriction 404 due to expansion of the flowing fluid.

In certain embodiments, the pipeline system 400 has a control system 306 to facilitate general control of the pipeline system 400 and to detect a constriction 404 in the pipeline 102. The control system 306 receives measured values of process variables. Such process variable values include temperature values received via optics control components 304 from the fiber-optic cable 104 sensor, as well as pressure and flow rate values from other instrumentation 308, and the like. The control system 306 detects constrictions 404 based at least in part on the process variables. In particular embodiments, the control system 306 may employ a control model 406 utilizing such process variable values to detect constrictions.

A fiber-optic cable 104 sensor and associated optics control components 304 measure temperature of the external surface 106 and pipewall. In this example, the fiber-optic cable 104 is a sensor that provides for distributed sensing of temperature, such as at about every one meter of the length of the pipeline 102 or a segment of the pipeline 102. Of course, other sensitivity distances may be implemented or realized, such as a few meters or longer, for the temperature sensing. In any case, the optics control components 304 may transmit a signal indicative of the measured temperature to the control system 306. Further, the fiber-optic cable 104 may include one or more optical fibers as the distributed sensor for sensing temperature.

Instrumentation 308 may include one or more pressure measurement devices 308A, 308B to measure and indicate operating pressures of the pipeline 102. The instrumentation 308 may also include devices to measure or determine flow rate of the contents (e.g., production fluid) flowing through the pipeline 102. The instrumentation 308 may transmit signals indicative of the measured pressure and measured or determined flow rate, respectively.

The control system 306 analyzes the temperature, pressure, and flow rate data, and optionally other data, to determine if a constriction is forming or exists in the pipeline 102. Such a constriction 404 may form on the internal surface 112 and extend or protrude into the flow path 110 of the pipeline 102. To detect a constriction 404, the control system 306 is programmed to perform calculations and make determinations based on the temperature, pressure, flow rate, and optionally additional process variables. Such programming may be logic or code stored in memory or other non-transitory, computer-readable medium of the control system 306 and executable by a processor 408 of the control system 306. The processor 408 may be a central processing unit (CPU) or other type of processor.

In particular embodiments, the control system 306 has a control model 406 that facilitates or incorporates the calculations and assessment of a possible constriction. The control model 406 may be logic or code stored in memory or other non-transitory, computer-readable medium of the control system 306 and executable by the processor 408. Inputs to the control model 406 may be values for temperature, pressure, and volume, or some prior manipulation of such data. Outputs of the model may be a numerical assessment presented as a qualitative notification of the presence of a constriction 404, such a "yes" or "no" or "possibly". A numerical assessment may be directly provided to indicate a possible presence of a constriction 404. For example, a prediction of a constriction 404 by the control system 306 or control model 406 may be presented as a factor or percentage probability. Other outputs of the control model 406 may include an approximate location along the pipeline (e.g., in linear length) that a constriction is likely, suggested actions for remediation of a constriction 404, and so forth.

In assessing if a constriction 404 is forming or present, the control system 306 considers the measured temperature values received from the optics control components 304 and the fiber-optic cable 104 sensor. The control system 306 is programmed with a temperature module 410 to determine a measured temperature at each of a plurality of points along the pipeline 102 using the fiber-optic cable 104, having the optical fiber as a distributed sensor. The temperature module 410 may be logic or code stored in memory or other non-transitory, computer-readable medium of the control system 306 and executable by the processor 408. The use of the fiber-optic cable 104 involves sensing temperature of the pipeline 102 with the optical fiber.

The control system 306 detects and locates a temperature anomaly based on the measured temperature values received from the optic control components 304 and the fiber-optic 104 cable sensor. The temperature module 410 or an analysis module 414 discussed below may detect and locate a temperature anomaly via the fiber-optic cable 104.

A detected temperature anomaly as an increase in temperature measured at a particular location (e.g., one-meter location) along the linear length of the pipeline 102 may indicate a forming constriction, such as with the exothermic formation of hydrates on the internal surface 112 of the pipeline 102. A detected temperature anomaly as a drop in temperature measured at a particular location (e.g., one-meter location) along the linear length of the pipeline 102 may indicate a constriction. In other words, the contents flowing through the pipeline may experience a Joule-Thomson effect and thus a temperature reduction. The Joule-Thomson effect may occur in a relatively short linear region of the pipeline 102 due to the reduction in diameter at the constriction 404. Based on the drop in measured temperature received from the fiber-optic cable 104 and optical control components 304, the control system 306 may make a preliminary assessment that a constriction 404 is present in the pipeline 102.

Increased confirmation of the preliminary assessment that a constriction 404 is present is performed by the control system 306 with a hydraulic flow model 412. In particular, the temperature determined via the fiber-optic cable 104 sensor is compared to the predicted temperature for the pipeline 102 operation at that general location, as determined by the control model 406, to identify a temperature anomaly. The control model 406 may incorporate or work in concert with a hydraulic flow model 412. The hydraulic flow model 412 may be attuned to steady-stead conditions and also incorporate pressure and flow rate data, such as those values received from the instrumentation 308 or other sources. The hydraulic flow model 412 may be logic or code stored in memory or other non-transitory, computer-readable medium of the control system 306 and executable by the processor 408. The hydraulic flow model 412 may provide substantially real-time predicted fluid temperature and may be a custom simulation model or a pipeline hydraulics simulating software package, such as an oil and gas simulation software, for example OLGA®, Horizon, LedaFlow®, and others.

The control system 306 is programmed with an analysis module 414 to detect the temperature anomaly and to determine, detect, and locate the presence or possible presence of a constriction 404. The analysis module 414 compares the temperature of the pipeline 102 sensed by the fiber-optic cable 104 versus the normal or predicted temperature determined by the flow model 412. The comparison may detect a temperature anomaly and indicate a constriction 404. The comparison may be at a plurality of points generally along the pipeline 102 or at a location of a temperature anomaly, including as determined by the control system 306, or modules 410 or 414, and so forth. The analysis module 414 may receive a variety of inputs, including information provided by operating personnel and other data in assessing the potential presence of a constriction 404.

Lastly, the control system 306 may include flow management software 416 for the pipeline system 400 and pipeline 102. The flow management software 416 may be incorporated in the control model 406 or may work in concert with the control model 406.

In sum, embodiments provide a pipeline system 400 including a pipeline 102 to transport a production fluid that is hydrocarbon. The system 400 includes a fiber-optic cable 104 having an optical fiber (e.g., a distributed sensor) disposed along a length of the pipeline 102 to sense temperature of the pipeline 102. The pipeline system 400 has a control system 306, such as a DCS, PLC, independent computer system, and so on. The control system 306 includes a hydraulic flow model 412 to determine predicted or normal temperature of the pipeline, wherein inputs to the hydraulic flow model include pipeline hydraulic conditions, such as pressure and flow rate of the production fluid in the pipeline 102.

The control system 306 includes a first module or temperature module 410 to determine a measured temperature at each of a plurality of points along the pipeline 102 using the fiber-optic cable 104, having the optical fiber as a distributed sensor. The module 410 may also detect a temperature anomaly and determine a location of the temperature anomaly based on the temperature of the pipeline 102 sensed by the optical fiber. The control system 306 has a second module or analysis module 414 which may also detect and locate the temperature anomaly, such as based on a comparison of measured temperature values versus calculated or predicted temperature values. The analysis module 414 compares the temperature of the pipeline sensed by the optical fiber at the determined location versus the normal temperature calculated by the hydraulic flow model 412 for the location. The analysis module 414 of the control system 306 may then determine the presence of a constriction at the location based on the temperature anomaly and based on comparison of the temperature sensed by the optical fiber at the location versus the normal temperature determined by the flow model 412 for the location.

Figure 5:
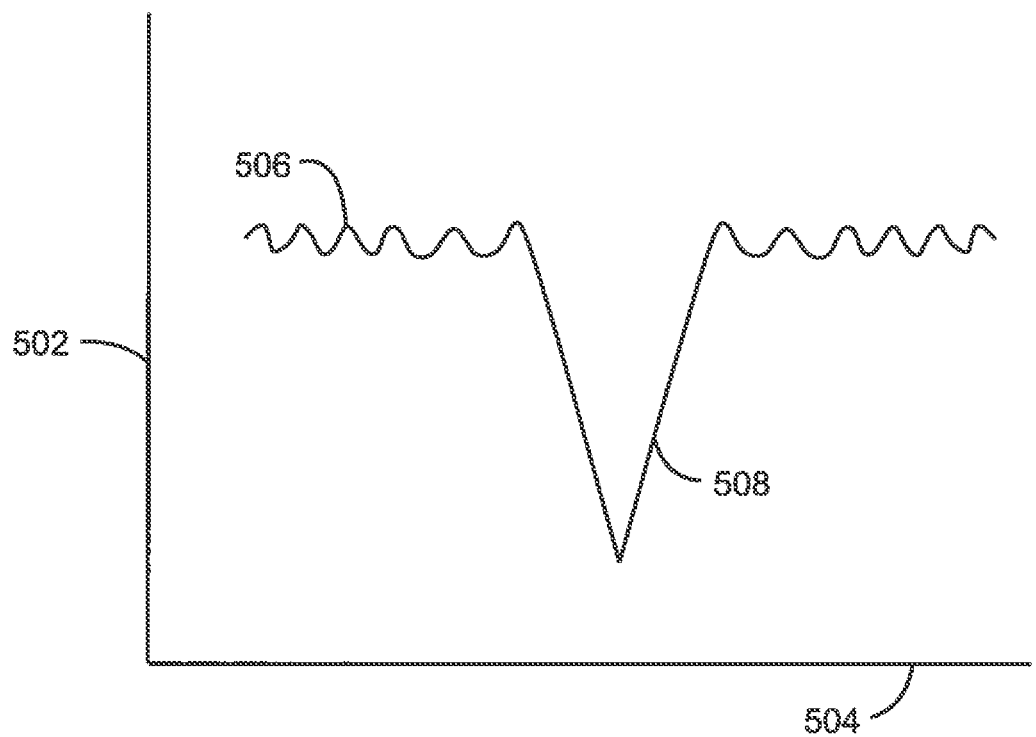
FIG. 5 is a graph of a plot of pipeline temperature versus pipeline length indicating a Joule-Thomson effect on the pipeline flowing contents at a constriction in the pipeline.

FIG. 5 is a graph of a plot 500 of temperature 502 of the pipeline 102 over the length 504 (e.g., in meters) of a pipeline 102 (FIGS. 1-4). The temperature 502 is that measured by the fiber-optic cable 104 as a distributed sensor indicating temperature, for example, along every one meter of length 504. The units of the temperature 502 may be in ° F. or ° C., or may be signal units indicative of temperature. The temperature 502 may be of the external surface or pipewall of the pipeline, or of the contents in the flow path of the pipeline.

In the illustrated embodiment, the curve 506 of pipeline temperature versus pipeline length has a portion 508 demonstrating an abrupt drop and recovery in temperature, as might be experienced due to the Joule-Thomson effect. The portion 508 of the curve 506 may generally correspond to the location of a constriction 404 in the pipeline 102, as shown in FIG. 4. A control system 306, as discussed with respect to FIGS. 3 and 4, or other computing system may interpret the data represented by the curve 506 as indicating a constriction at a length long the pipeline represented by portion 508 of the curve 506. The control system 306 may integrate such interpretation into flow management software (e.g., having a hydraulic flow model, relying on pressure and flow rate, etc.) to improve performance of the software.

As described herein, expansion of a gas may lead to a temperature change or a cooling effect. This phenomenon is termed the Joule-Thomson effect and is given by the formula in Eqn. 1, which calculates the Joule-Thomson coefficient.

$$\left(\frac{\partial T}{\partial P}\right)_H = \frac{V}{C_p}(\alpha T - 1) \qquad (1)$$

In Eqn. 1, the variables P, V, and T are the pressure, volume, and temperature of the gas, respectively. The term $C_p$ is the heat capacity of the gas at constant pressure, and the term a is the coefficient of thermal expansion of the gas. The partial differential on the left side of the equation represents the rate of change of temperature with pressure at constant enthalpy H and is called the Joule-Thomson coefficient. The Joule-Thomson effect may be observed when constrictions (such as a dent or hydrate or wax formations) are formed within a gas pipeline. For example, gas may locally contract and then expand near a flow constriction.

Figure 6:
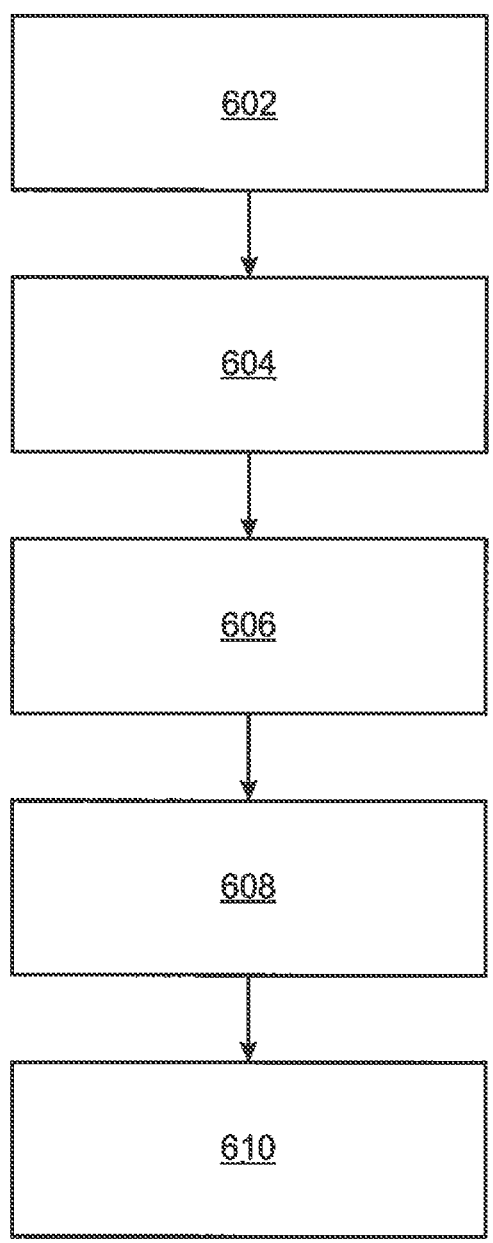
FIG. 6 is a process flow diagram of method of operating a pipeline system having an optical fiber to measure pipeline temperature and facilitate detection of a constriction in the pipeline.

FIG. 6 is a process flow diagram of a method 600 of operating a pipeline system. At block 602, a production fluid including hydrocarbon is conveyed through a pipeline. The hydrocarbon may be oil and gas, for example. At block 604, pipeline temperature, such as pipewall temperature, production fluid temperature, and the like, is sensed via an optical fiber as a distributed sensor disposed along the pipeline. The optical fiber may be associated with a fiber-optic cable. At block 606, the pressure and flow rate of the production fluid flowing in the pipeline is determined via instrumentation in the pipeline system. For example, pressure measurement devices on the pipeline may measure and indicate pipeline pressure. Moreover, the data of the pressure, flow rate, and optionally temperature are provided to a control system.

At block 608, the control system detects a constriction (e.g., solids accumulation, hydrate formation, asphaltenes deposition, sand or wax collection, mechanical damage, etc.) in the pipeline. The control system bases the detection on the pipeline temperature sensed via the optical fiber and on the pressure and flow rate of the production fluid. Indeed, such detection of the constriction involves the control system comparing the temperature of the pipeline sensed by the optical fiber with a calculated temperature of the production fluid as a function of the pressure and the flow rate. In certain embodiments, the control system detection of the constriction involves the control system employing a model to compare temperature of the pipeline sensed by the optical fiber with a calculated temperature simulated as a function of the pressure and the flow rate. Moreover, the control system, via the distributed sensing of the optical fiber, may determine the location of the constriction substantially contemporaneous with the control system detecting the constriction.

Lastly, at block 610, the control system may alert personnel of the constriction. The control system may also automatically implement remediation of the constriction in response to detection of the constriction. Of course, the control system may be configured to obtain human confirmation prior to implementing remedial action directed at the constriction.

Figure 7:
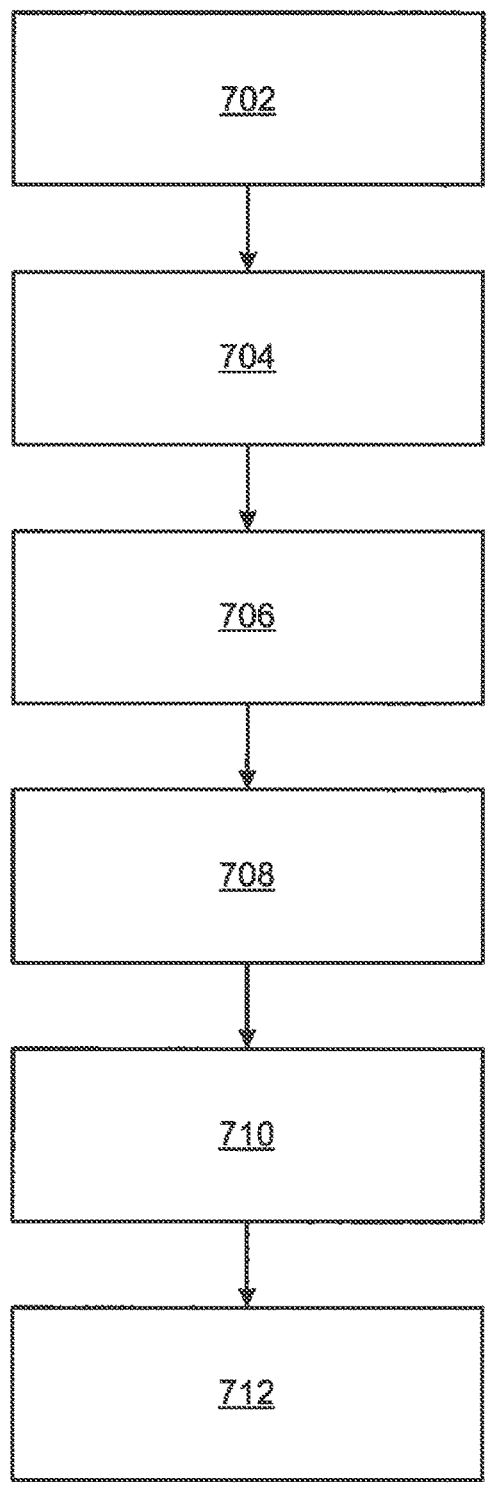
FIG. 7 is a process flow diagram of a method of constructing or retrofitting a pipeline system to a fiber-optic cable that senses pipeline temperature and facilitates detection of a constriction in the pipeline.

FIG. 7 is a process flow diagram of a method 700 of construction or retrofitting a pipeline system. At block 702, a fiber-optic cable is deployed along a pipeline of the pipeline system. The fiber-optic cable is or includes an optical fiber as a distributed sensor or intrinsic sensor to facilitate measurement of temperature of the pipeline. The fiber-optic cable may be routed or disposed external or internal to the pipeline.

Redundancy of the fiber-optic cable sensor along the pipeline may be accommodated. Further, the installation of an optical fiber or fiber-optic cable may involve damage avoidance strategies and protection for the fiber-optic cable, such as from crushing or abrasion. Moreover, the fiber-optic cable may be coupled to the pipeline by various techniques. For instance, continuous wraps, polymer straps, and the like may be used to attach the cable system to the pipeline in certain examples. Additionally, the number and spacing of fiber-optic cables, the type and location of any tensioner and stinger support roller boxes, mechanical and space considerations, weather factors, and so on, may be implemented and evaluated. Of course, other installation considerations are applicable to the present techniques.

At block 704, the method 700 includes coupling optical control components to the fiber-optic cable, and with the optical control components including at least a light source and a detector. At block 706, additional instrumentation is installed in the pipeline system to determine pressure and flow rate of a production fluid (e.g., hydrocarbon) flowing through the pipeline when the pipeline is in operation.

At block 708, the method includes providing a control system of the pipeline system to detect a constriction in the pipeline correlative with the temperature measured via the optical fiber and with the pressure and flow rate of the production fluid. For example, the control system is programmed to detect a constriction by comparing the temperature of the pipeline sensed by the optical fiber with a determined temperature of the production fluid calculated based on the pressure and flow rate of the production fluid. In this programming and configuring of the control system, the control system may be programmed to both detect and locate the constriction. In fact, the control system may be programmed to determine the location of the constriction in the pipeline flow path substantially contemporaneous with the control system detecting the constriction.

At block 710, the control system is programmed to alert personnel of the constriction in response to detection of the constriction. Lastly, at block 712, the control system is programmed to initiate remedial action directed at the constriction in response to detection of the constriction, either automatically or under manual control.

The design and subsequent operation of the fiber-optic sensors may accommodate a variety of applications, temperature ranges, any external hydrostatic pressures, and so forth. Further, because of the attenuation of signal along an optical fiber, repeaters may be employed, such as at approximately 40 kilometer (km) intervals, for amplifying the optical signal in certain examples. As indicated, during the operation of a distributed fiber-optic sensor, alarm thresholds may be set and real-time data processing implemented.

In conclusion, embodiments may include a pipeline system having a pipeline to transport a production fluid including hydrocarbon, and an optical fiber disposed along a length of the pipeline. The pipeline system includes a control system having a hydraulic flow model to determine a predicted operating temperature at each of a plurality points along the pipeline, wherein inputs to the hydraulic flow model include pipeline hydraulic conditions, such as pressure and flow rate of the production fluid in the pipeline. The control system includes a temperature module to determine a measured temperature at each of the plurality of points along the pipeline using the optical fiber. Additionally, the control system includes an analysis module to compare the measured temperature of the pipeline at each of the plurality of points to the predicted operating temperature to detect a temperature anomaly and determine a location of the temperature anomaly. The optical fiber is a distributed sensor to sense temperature of the pipeline, and wherein the measured temperature is based on the temperature of the pipeline sensed by the optical fiber. The control system or the analysis module is configured to determine a presence of a constriction at the location of the temperature anomaly based on the temperature anomaly and based on comparison of the measured temperature at the location versus the predicted operating temperature at the location.

While the present techniques may be susceptible to various modifications and alternative forms, the exemplary embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A pipeline system comprising:
   a pipeline to transport a production fluid comprising hydrocarbon; and
   a constriction detection system consisting essentially of:
   an optical fiber disposed along a length of the pipeline;
   instrumentation to measure the pressure of the production fluid in the pipeline;
   instrumentation to determine the flow rate of the production fluid in the pipeline;
   and
   a control system comprising:
   a hydraulic flow model to determine a predicted operating temperature at each of a plurality points along the pipeline, wherein inputs to the hydraulic flow model include pipeline hydraulic conditions comprising pressure and flow rate of the production fluid in the pipeline;
   a temperature module to determine a measured temperature at each of the plurality of points along the pipeline using the optical fiber; and
   an analysis module to compare the measured temperature of the pipeline at each of the plurality of points to the predicted operating temperature to detect a temperature anomaly and determine a location of the temperature anomaly.

2. The pipeline system of claim 1, wherein the optical fiber is a distributed sensor to sense temperature of the pipeline, and wherein the measured temperature is based on the temperature of the pipeline sensed by the optical fiber.

3. The pipeline system of claim 2, wherein the temperature of the pipeline sensed by the optical fiber comprises a temperature of a pipewall of the pipeline.

4. The pipeline system of claim 2, wherein the temperature of the pipeline sensed by the optical fiber comprises a temperature of the production fluid in the pipeline.

5. The pipeline system of claim 2, wherein the analysis module is configured to determine a presence of a constriction at the location of the temperature anomaly based on the temperature anomaly and based on comparison of the measured temperature at the location versus the predicted operating temperature at the location.

6. The pipeline system of claim 5, wherein the control system is configured to alert personnel of the constriction.

7. The pipeline system of claim 5, wherein the control system is configured to automatically implement remedial action directed to the constriction.

8. The pipeline system of claim 1, wherein the optical fiber is disposed along an external surface of the pipeline.

9. The pipeline system of claim 1, wherein the optical fiber is disposed in a flow path of the pipeline.

10. The pipeline system of claim 1, wherein the hydraulic conditions comprise temperature of the pipeline indicated by a temperature sensor other than the optical fiber.

11. The pipeline system of claim 1, wherein the control system comprises a control model incorporating the temperature module, the analysis module, and the hydraulic flow model.

12. The pipeline system of claim 1, wherein the control system comprises a control model integrating the temperature module, analysis module, and hydraulic flow model with flow management software.

13. A method of operating a pipeline system, the method comprising:
    conveying a production fluid comprising hydrocarbon through a pipeline;
    sensing temperature of the pipeline via an optical fiber as a distributed sensor disposed along a length of the pipeline;
    determining pressure and flow rate of the production fluid in the pipeline via instrumentation in the pipeline system;
    determining normal temperature of the pipeline via a hydraulic flow model; and
    detecting via a constriction detection system a constriction in the pipeline based on the temperature of the pipeline sensed by the optical fiber;
    wherein the constriction detection system consists essentially of:
    the optical fiber disposed along the length of the pipeline;
    the instrumentation to measure the pressure of the production fluid in the pipeline;
    the instrumentation to determine the flow rate of the production fluid in the pipeline; and
    a control system comprising:
    a hydraulic flow model to determine a predicted operating temperature at each of a plurality points along the pipeline, wherein inputs to the hydraulic flow model include pipeline hydraulic conditions comprising pressure and flow rate of the production fluid in the pipeline;
    a temperature module to determine a measured temperature at each of the plurality of points along the pipeline using the optical fiber; and
    an analysis module to compare the measured temperature of the pipeline at each of the plurality of points to the predicted operating temperature to detect a temperature anomaly and determine a location of the temperature anomaly.

14. The pipeline system of claim 1, wherein the system is designed to detect a constriction at a point along the pipeline by detecting a temperature decrease between the measured temperature sensed by the optical fiber at the point relative to the predicted operating temperature by the analysis module at the point, wherein the temperature decrease between the measured temperature sensed by the optical fiber at the point relative to the predicted operating temperature by the analysis module at the point is due to the expansion of a flowing fluid within the pipeline resulting from a reduction of the effective internal diameter of the pipeline.

15. The pipeline system of claim 1, wherein the system is designed to detect a constriction at a point along the pipeline by detecting a temperature increase between the measured temperature sensed by the optical fiber at the point relative to the predicted operating temperature by the analysis module at the point, wherein the temperature increase between the measured temperature sensed by the optical fiber at the point relative to the predicted operating temperature by the analysis module at the point is due to the exothermic formation of hydrates within the pipeline.

16. A method of operating a pipeline system, the method comprising:
  conveying a production fluid comprising hydrocarbon through a pipeline; and
  via a constriction detection system:
    sensing temperature at a plurality pf points of the pipeline via an optical fiber as a distributed sensor disposed along a length of the pipeline;
    determining pressure and flow rate of the production fluid in the pipeline via instrumentation in the pipeline system;
    determining normal temperature of the pipeline via a hydraulic flow model having the pressure and the flow rate as inputs; and
    detecting via a control system a constriction in the pipeline based on the temperature of the pipeline sensed by the optical fiber, and based on a comparison of the temperature of the pipeline sensed by the optical fiber versus the normal temperature determined by the hydraulic flow model;
  wherein the constriction detection system consists essentially of:
    the optical fiber disposed along a length of the pipeline;
    the instrumentation to measure the pressure of the production fluid in the pipeline;
    the instrumentation to determine the flow rate of the production fluid in the pipeline; and
    the control system comprising:
      a hydraulic flow model to determine a predicted operating temperature at each of a plurality points along the pipeline, wherein inputs to the hydraulic flow model include pipeline hydraulic conditions comprising pressure and flow rate of the production fluid in the pipeline;
      a temperature module to determine a measured temperature at each of the plurality of points along the pipeline using the optical fiber; and
      an analysis module to compare the measured temperature of the pipeline at each of the plurality of points to the predicted operating temperature to detect a temperature anomaly and determine a location of the temperature anomaly.

17. The method of claim 16, comprising determining via the control system a location of the constriction in a flow path of the pipeline substantially contemporaneous with the control system detecting the constriction.

18. The method of claim 16, comprising alerting personnel of the constriction via the control system.

19. The method of claim 16, comprising automatically implementing remediation of the constriction via the control system in response to detection of the constriction.

20. A method of constructing or retrofitting a pipeline system, the method comprising:
  deploying a fiber-optic cable along a length of a pipeline configured to convey production fluid comprising hydrocarbon, the fiber-optic cable having an optical fiber as a distributed sensor to facilitate measurement of temperature of the pipeline;
  coupling optical control components to the fiber-optic cable, the optical control components comprising a light source and a detector; and
  providing a control system of the pipeline system to:
    employing a hydraulic flow model to calculate a predicted temperature of the pipeline, wherein inputs to the hydraulic flow model comprise pressure and flow rate of the production fluid;
    detecting a temperature anomaly and identify a location along the pipeline of the temperature anomaly based on the temperature measured via the optical fiber; and
    detecting a constriction in the pipeline at the location based on the temperature anomaly via a constriction detection system;
  wherein the constriction detection system consists essentially of:
    the optical fiber disposed along the length of the pipeline;
    instrumentation to measure the pressure of the production fluid in the pipeline;
    instrumentation to determine the flow rate of the production fluid in the pipeline; and
    a control system comprising:
      the hydraulic flow model;
      a temperature module to determine a measured temperature at each of the plurality of points along the pipeline using the optical fiber; and
      an analysis module to compare the measured temperature of the pipeline at each of the plurality of points to the predicted operating temperature to detect the temperature anomaly and determine the location of the temperature anomaly.

21. The method of claim 20, comprising installing instrumentation to determine the pressure and the flow rate of the production fluid in the pipeline.

22. The method of claim 20, wherein the control system alerts personnel of the constriction in response to detection of the constriction.

23. The method of claim 20, wherein the control system automatically initiates remedial action directed at the constriction in response to detection of the constriction.

24. The method of claim 20, wherein deploying the fiber-optic cable comprises routing the fiber-optic cable external to the pipeline.

25. The method of claim 20, wherein deploying the fiber-optic cable comprises routing the fiber-optic cable internal to the pipeline.

26. The method of claim 13, comprising automatically implementing remediation of the constriction via the constriction detection system in response to detection of the constriction.

27. The method of claim 13, comprising determining via the constriction detection system a location of the constriction in a flow path of the pipeline substantially contemporaneous with the control system detecting the constriction.

28. The method of claim 13, comprising alerting personnel of the constriction via the constriction detection system.

29. The method of claim 13, further comprising detecting a constriction at a point along the pipeline by detecting a temperature decrease between the measured temperature sensed by the optical fiber at the point relative to the predicted operating temperature by the analysis module at the point, wherein the temperature decrease between the measured temperature sensed by the optical fiber at the point relative to the predicted operating temperature by the analysis module at the point is due to the expansion of a flowing fluid within the pipeline resulting from a reduction of the effective internal diameter of the pipeline.

30. The method of claim 13, further comprising detecting a constriction at a point along the pipeline by detecting a temperature increase between the measured temperature sensed by the optical fiber at the point relative to the predicted operating temperature by the analysis module at the point, wherein the temperature increase between the measured temperature sensed by the optical fiber at the point relative to the predicted operating temperature by the analysis module at the point is due to the exothermic formation of hydrates within the pipeline.

\* \* \* \* \*